(12) United States Patent
Swanson et al.

(10) Patent No.: US 8,038,430 B2
(45) Date of Patent: Oct. 18, 2011

(54) METHOD OF USING IMAGE DATA IN THE PRODUCTION OF THIN WALL EXTRUSIONS

(75) Inventors: John W. Swanson, Portland, OR (US); Lucien M. Rucker, Beaverton, OR (US)

(73) Assignee: Advanced Neuromodulation Systems, Inc., Plano, TX (US)

( * ) Notice: Subject to any disclaimer, the term of this patent is extended or adjusted under 35 U.S.C. 154(b) by 0 days.

(21) Appl. No.: 12/578,281

(22) Filed: Oct. 13, 2009

(65) Prior Publication Data

US 2010/0266749 A1  Oct. 21, 2010

Related U.S. Application Data

(63) Continuation of application No. 11/429,346, filed on May 5, 2006, now abandoned, which is a continuation of application No. 10/958,881, filed on Oct. 4, 2004, now abandoned, which is a continuation of application No. 10/386,589, filed on Mar. 12, 2003, now Pat. No. 6,814,557, which is a continuation of application No. 09/461,078, filed on Dec. 14, 1999, now Pat. No. 6,537,471.

(51) Int. Cl.
*B29C 47/00* (2006.01)
*B29C 47/88* (2006.01)
*B32B 15/04* (2006.01)

(52) U.S. Cl. .................. 425/378.1; 425/113; 425/133.1; 425/140; 425/141; 425/143; 425/171; 425/172; 425/173; 425/197; 264/40.1; 264/40.6; 264/171.14; 264/177.19; 264/210.5; 264/211.12; 264/211.17; 264/211.2

(58) Field of Classification Search .................. None
See application file for complete search history.

(56) References Cited

U.S. PATENT DOCUMENTS

| | | | |
|---|---|---|---|
| 2,162,210 A | 6/1939 | Ditts | |
| 2,546,629 A | 3/1951 | Brillhart | |
| 2,960,951 A | 11/1960 | Bierman, Jr. | |
| 2,991,504 A | 7/1961 | Eppler | |
| 3,206,802 A | 9/1965 | Riper | |
| 3,221,371 A | 12/1965 | Alexander | |
| 3,222,721 A | 12/1965 | Reynolds, Jr. | |
| 3,593,011 A | 7/1971 | Beauxis, Jr. et al. | |
| 3,635,621 A * | 1/1972 | Miyauchi et al. | 425/113 |
| 3,689,610 A * | 9/1972 | Nicholson | 264/40.3 |
| 3,744,947 A | 7/1973 | Skobel | |
| 3,757,616 A | 9/1973 | Raccio | |
| 3,807,916 A | 4/1974 | Ramsey | |

(Continued)

OTHER PUBLICATIONS

Frados, Joel, "Plastics Engineering Handbook of the Society of the Plastics Industry, Inc.", fourth edition, pp. 188-191, 1976.

(Continued)

*Primary Examiner* — Jeffrey Wollschlager
(74) *Attorney, Agent, or Firm* — Christopher S. L. Crawford; Craig Hoersten; Melissa Acosta

(57) ABSTRACT

A method of coating metal wire with extrudate using an extrusion system. The method includes the steps of advancing the metal wire through an extrusion die of the extrusion system and extruding molten extrudate over the metal wire as the metal wire is advanced through the extrusion die. Image data is generated, using one or several electronic cameras, concurrently with the advancing, and extruding to provide visual feedback indicative of the concentricity or non-concentricity of extrudate surrounding the metal wire as the metal wire exits the extrusion die.

7 Claims, 8 Drawing Sheets

U.S. PATENT DOCUMENTS

| | | | |
|---|---|---|---|
| 3,877,857 A | | 4/1975 | Melead |
| 3,968,463 A | * | 7/1976 | Boysen .......... 333/243 |
| 4,080,131 A | * | 3/1978 | Bahder et al. ........ 425/113 |
| 4,111,621 A | * | 9/1978 | Otani .......... 425/97 |
| 4,182,734 A | | 1/1980 | Takano et al. |
| 4,212,620 A | | 7/1980 | McLaren |
| 4,234,531 A | * | 11/1980 | Jocteur .......... 264/169 |
| 4,247,596 A | | 1/1981 | Yee |
| 4,260,351 A | | 4/1981 | Takano et al. |
| 4,290,206 A | | 9/1981 | Benjamin et al. |
| 4,340,554 A | | 7/1982 | Bardwell |
| 4,368,026 A | | 1/1983 | Budel et al. |
| 4,468,435 A | * | 8/1984 | Shimba et al. .......... 428/383 |
| 4,525,131 A | | 6/1985 | Hauser, Jr. |
| 4,551,087 A | | 11/1985 | Pan et al. |
| 4,605,525 A | | 8/1986 | Baxter |
| 4,642,686 A | | 2/1987 | Nagano et al. |
| 4,647,208 A | * | 3/1987 | Bieman .......... 356/615 |
| 4,668,173 A | | 5/1987 | Garner et al. |
| 4,684,487 A | | 8/1987 | Gawrisch |
| 4,710,114 A | | 12/1987 | Garner |
| 4,793,928 A | * | 12/1988 | Tsukamoto et al. .......... 210/344 |
| 4,826,706 A | | 5/1989 | Hilker et al. |
| 4,826,726 A | * | 5/1989 | Maeda et al. .......... 428/379 |
| 4,862,422 A | | 8/1989 | Brac |
| 4,871,493 A | | 10/1989 | Goto |
| 4,902,420 A | * | 2/1990 | Pall et al. .......... 210/346 |
| 4,909,630 A | | 3/1990 | Gawrisch et al. |
| 5,094,600 A | * | 3/1992 | Sikora .......... 425/113 |
| 5,102,602 A | | 4/1992 | Ziegler |
| 5,108,683 A | | 4/1992 | Anand |
| 5,128,175 A | * | 7/1992 | Yamanishi et al. .......... 427/515 |
| 5,218,084 A | | 6/1993 | Klusener et al. |
| 5,249,948 A | | 10/1993 | Koslow |
| 5,272,649 A | | 12/1993 | Campbell et al. |
| 5,330,697 A | * | 7/1994 | Wong .......... 264/173.12 |
| 5,415,748 A | | 5/1995 | Emiliani et al. |
| 5,424,018 A | | 6/1995 | Paul et al. |
| 5,431,867 A | | 7/1995 | Matsushita et al. |
| 5,458,830 A | | 10/1995 | Shin et al. |
| 5,498,145 A | | 3/1996 | Sikora et al. |
| 5,587,184 A | | 12/1996 | Leonard et al. |
| 5,608,637 A | | 3/1997 | Wang et al. |
| 5,674,440 A | | 10/1997 | Klinedinst |
| 5,723,517 A | | 3/1998 | Campo et al. |
| 5,741,531 A | | 4/1998 | Kowalski et al. |
| 5,795,531 A | * | 8/1998 | Salzmann et al. .......... 264/408 |
| 5,882,741 A | * | 3/1999 | Rubin et al. .......... 428/1.33 |
| 6,065,744 A | | 5/2000 | Lawrence |
| 6,250,904 B1 | | 6/2001 | Reddy et al. |
| 6,485,662 B1 | * | 11/2002 | Neubauer et al. .......... 264/169 |
| 6,537,471 B2 | | 3/2003 | Swanson et al. |
| 6,769,899 B2 | | 8/2004 | Groeblacher et al. |
| 6,814,557 B1 | | 11/2004 | Swanson et al. |
| 2002/0109259 A1 | | 8/2002 | Groeblacher et al. |

OTHER PUBLICATIONS

Rauwendaal, Chris, "Polymer Extrusion," 1994, pp. 68-79, 102-107, 310-315.

* cited by examiner

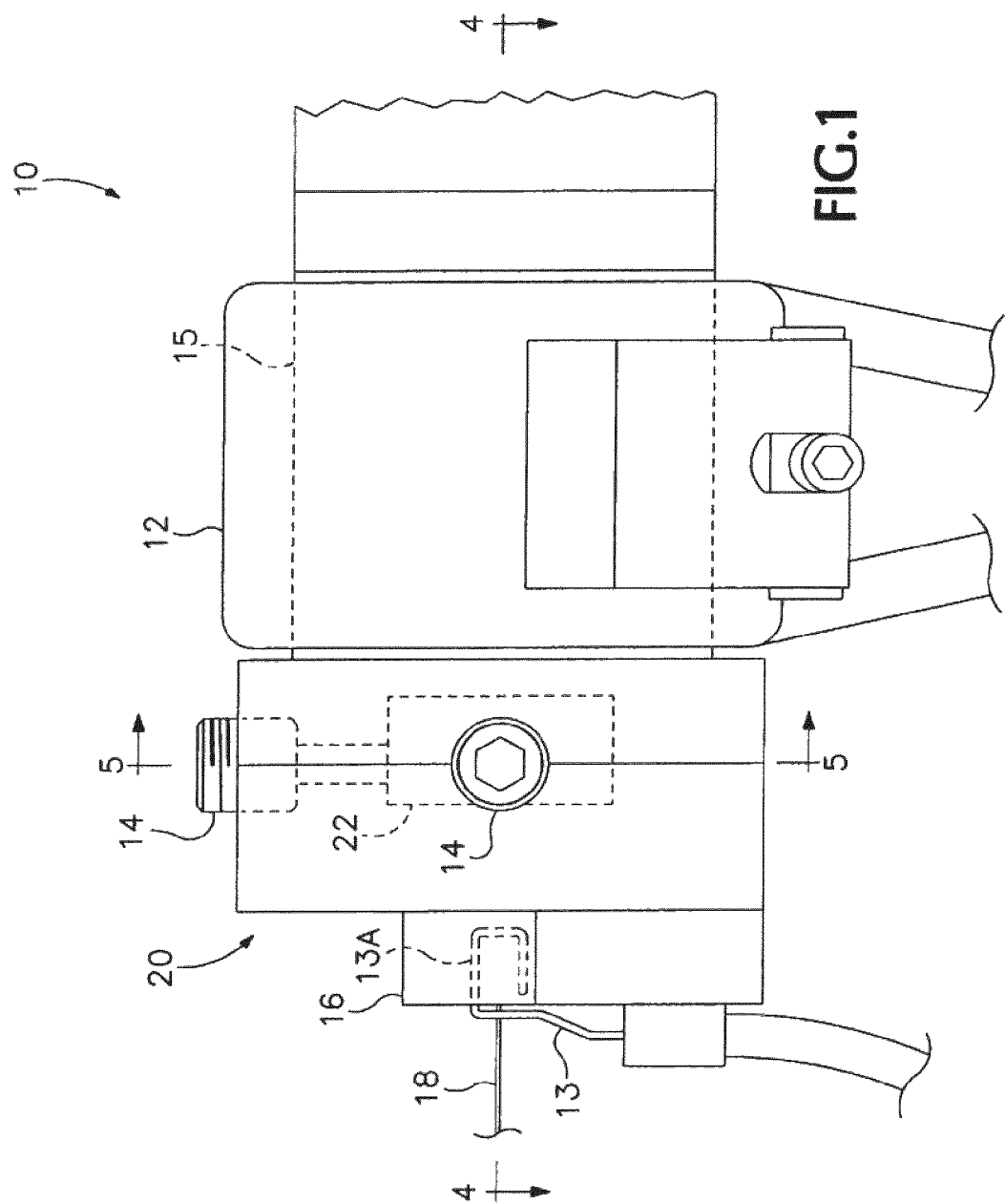

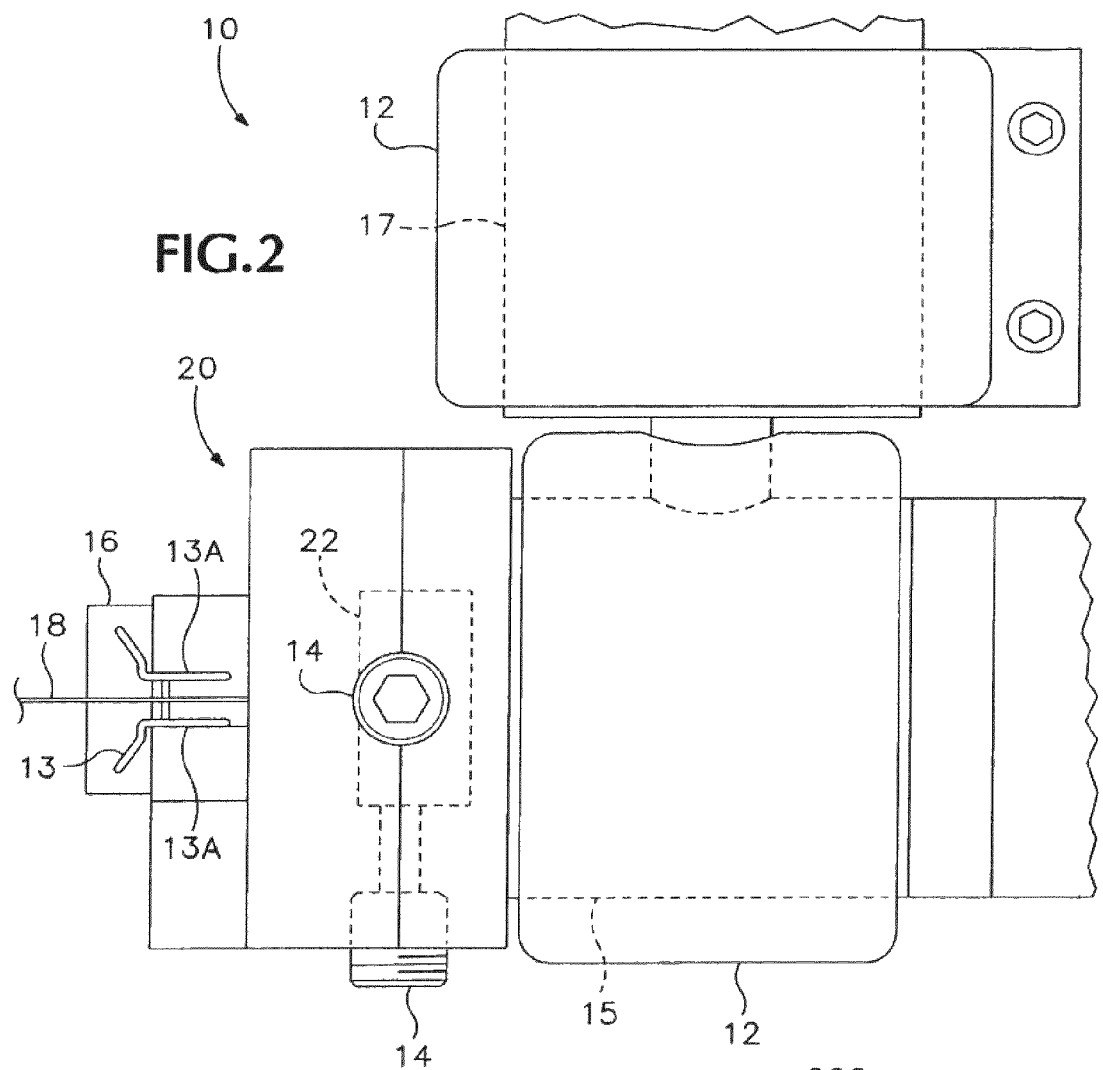
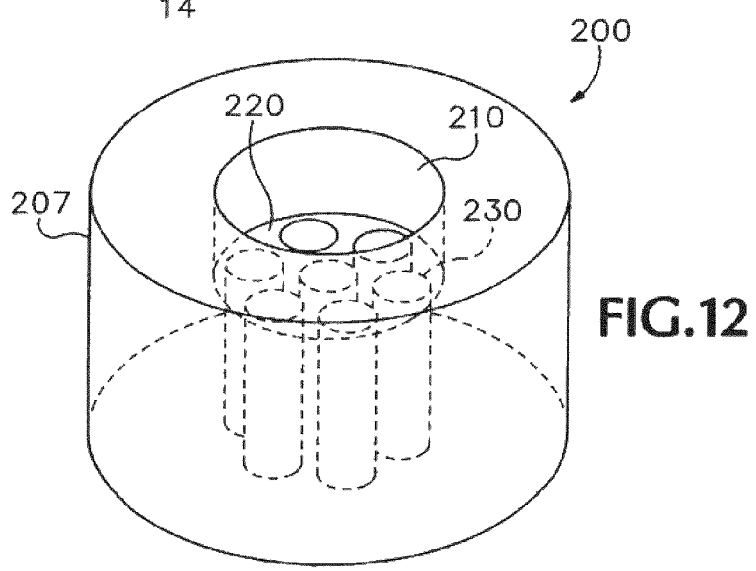

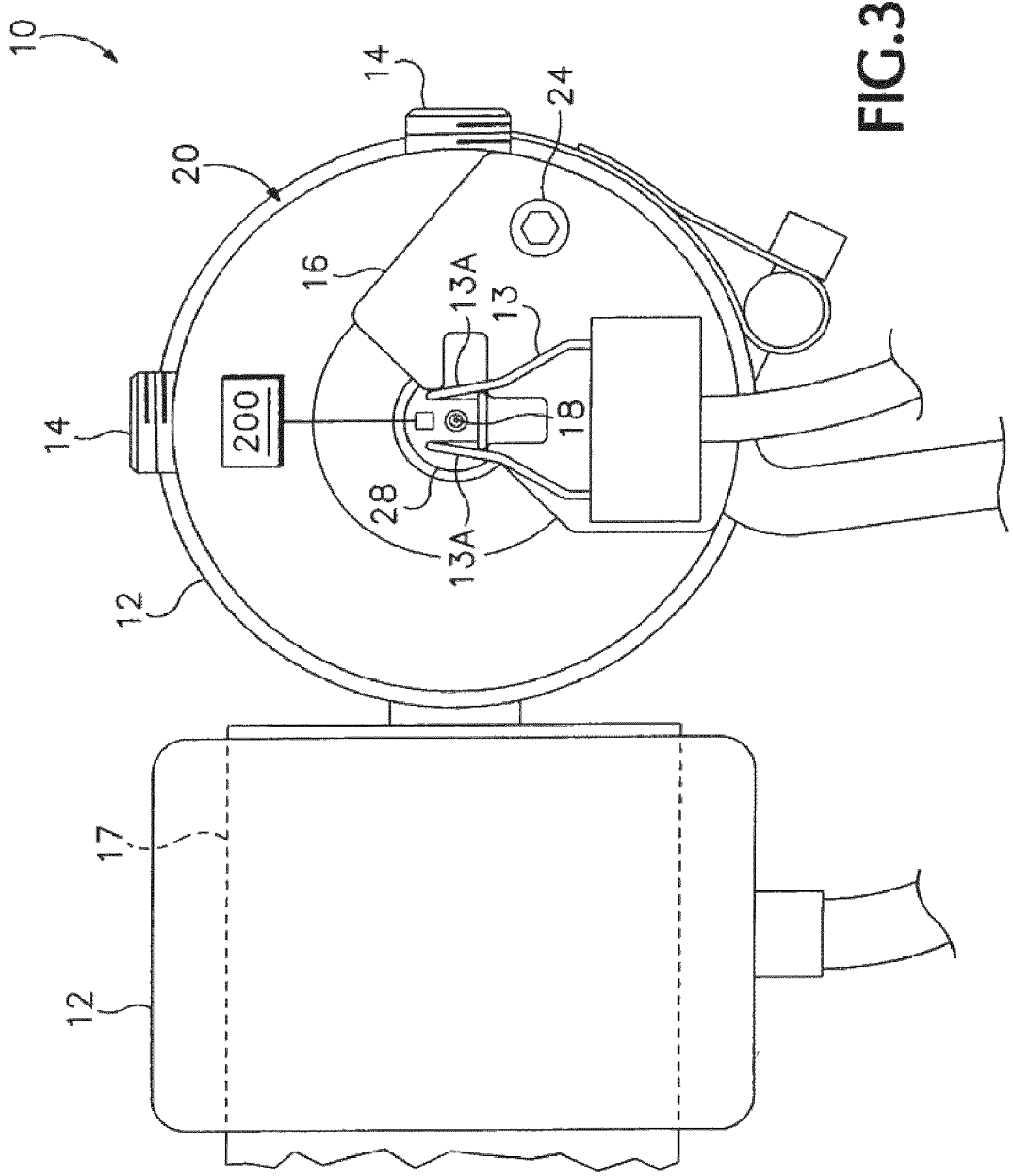

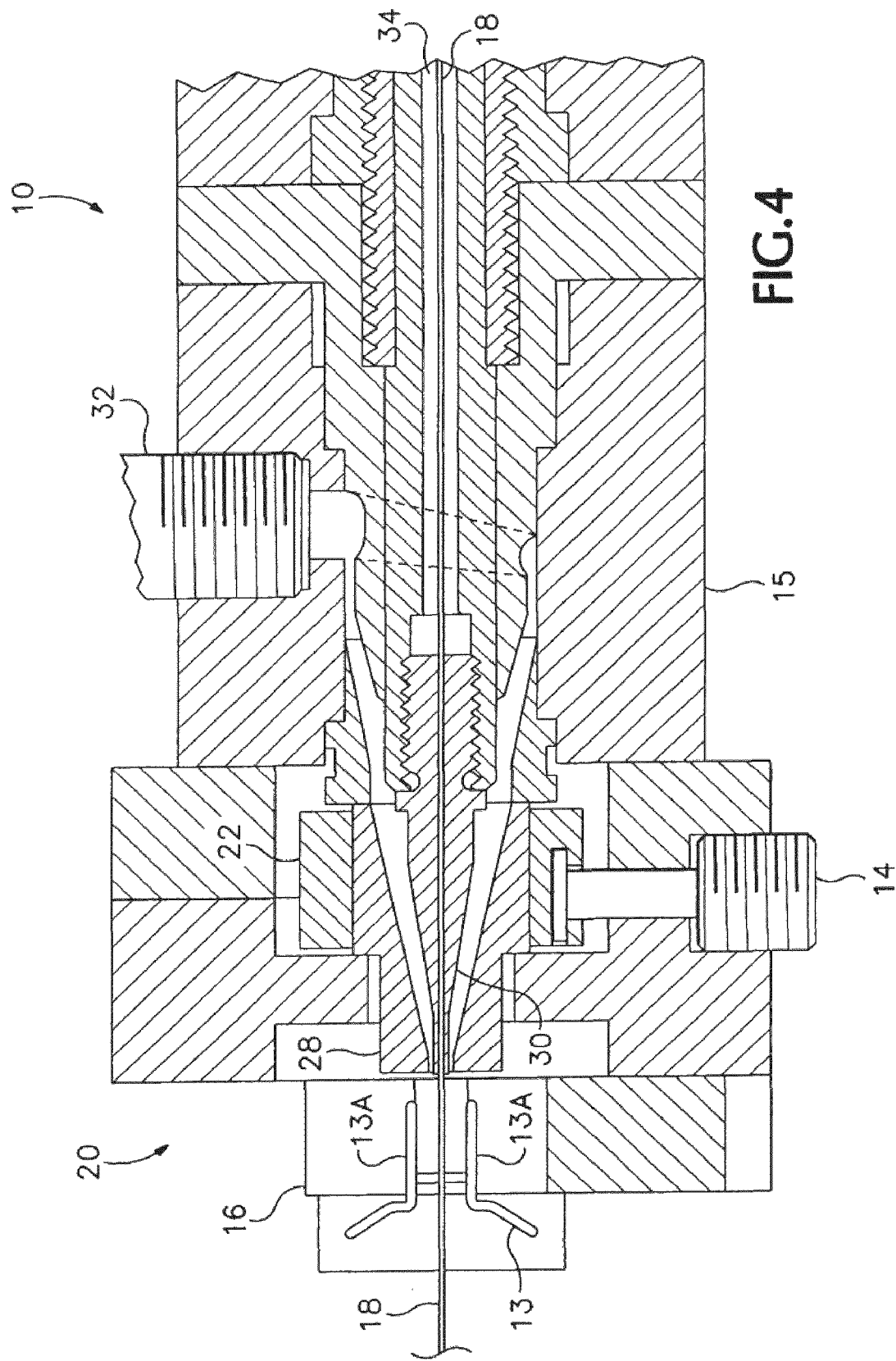

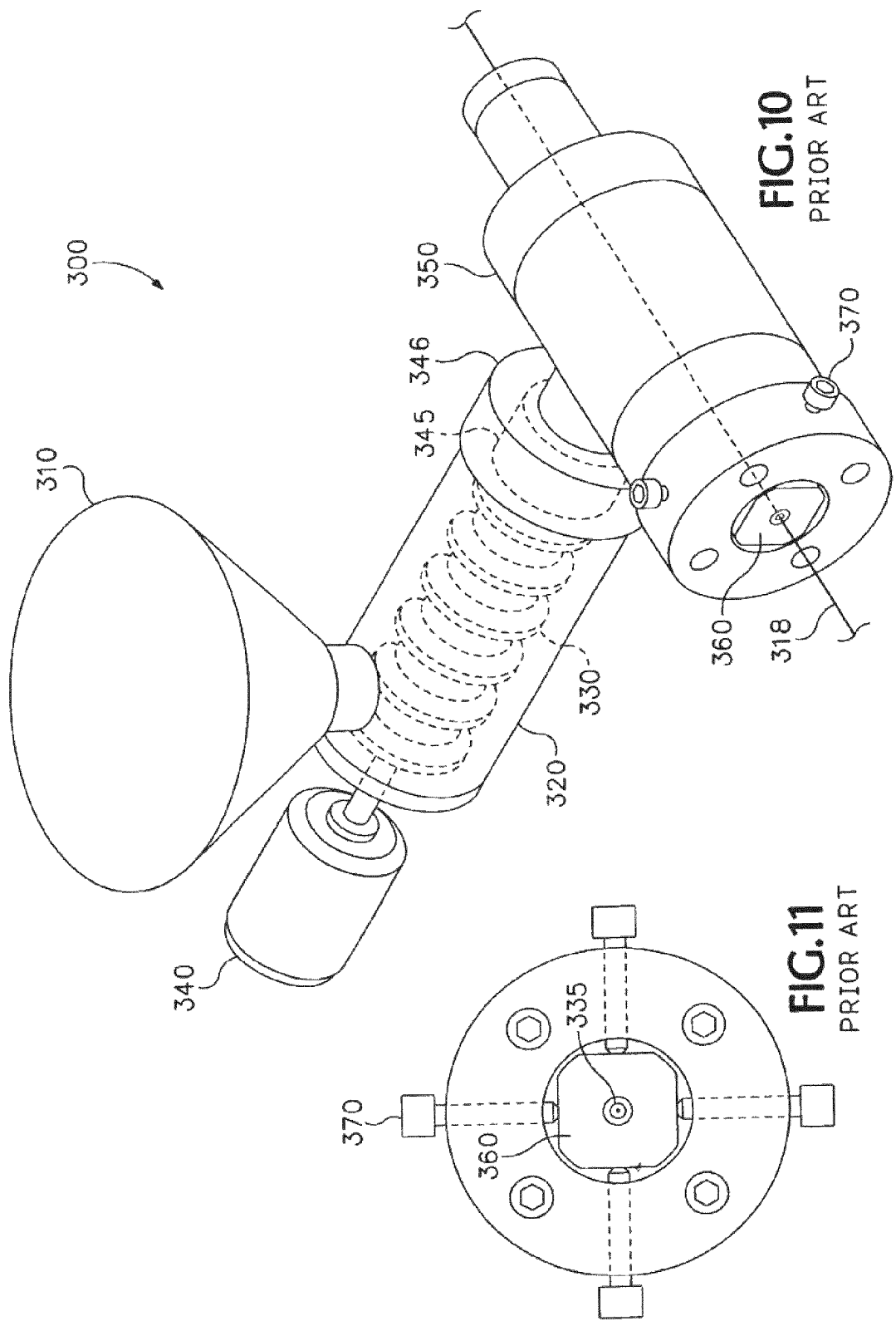

METHOD OF USING IMAGE DATA IN THE PRODUCTION OF THIN WALL EXTRUSIONS

CROSS-REFERENCE TO RELATED APPLICATIONS

This application is a continuation of U.S. application Ser. No. 11/429,346, filed May 5, 2006, now abandoned which was a continuation of U.S. application Ser. No. 10/958,881, filed Oct. 4, 2004, now abandoned, which was a continuation of U.S. application Ser. No. 10/386,589, filed Mar. 12, 2003, now U.S. Pat. No. 6,814,557, which was a continuation of U.S. application Ser. No. 09/461,078, filed Dec. 14, 1999, now U.S. Pat. No. 6,537,471, which are all incorporated herein by reference.

STATEMENT OF GOVERNMENT SUPPORT

This invention was made with government support under 2R44NS34993 awarded by SBIR. The government has certain rights in the invention.

BACKGROUND

This invention pertains to an apparatus and a method of producing ultra-thin walled extruded polymer products using a polymer extruder. Polymer extruders are used to produce polymer tubes and ducts and to coat with polymers circular, rectangular, stranded and coiled conductors, such as electrical wires, ribbons, cables and coils.

A common type of extruder employed in manufacturing such extruded polymer products is a "⅜-inch single screw cross-head" extruder 300. In such an extruder, polymers in the form of pellets are placed in a feed hopper 310 and thus fed into an extruder barrel 320. See FIG. 10. Extruder barrel 320 houses a helical extruder screw 330. It should be noted that commercially available pellets must be repelletized, i.e., resized, to a smaller size for use in ⅜ inch extruders to avoid damage to the extruder screw. The polymer fills the spaces between the surface of extruder screw 330 and the interior walls of extruder barrel 320. The screw is rotated about its longitudinal axis by an electric motor 340 while extruder barrel 320 remains stationary. The 340 while extruder barrel 320 remains stationary. The rotation of extruder screw 330 transports the polymer through extruder barrel 320 creating pressure and friction between the polymer and the interior walls of the extruder barrel 320. The combination of pressure, friction and additional heat provided by heaters melt the polymer. In polymer extrusion, the additional heat is most commonly supplied by electric resistance heaters, which are placed along the exterior of extruder barrel 320.

By the time the polymer has traveled the length of the extruder barrel, it is completely melted. The molten polymer, i.e., polymer melt, is then forced through a breaker plate 345, which is housed in the body of the adapter 346. Breaker plate 345 causes the polymer melt to flow in a linear direction as opposed to a helical direction.

Breaker plate 345 is a metal cylinder which provides five channels, for polymer melt flow, running along the length of the cylinder. For example, the breaker plate that is provided in a typical ⅜-inch extruder is approximately 0.377 inches in length and has an overall diameter of approximately 0.748 inches and provides five channels each having a diameter of approximately 0.110 inches. Accordingly, the overall cross-sectional area of the standard breaker plate is 0.439 square inches and the cross-sectional area provided for polymer flow is approximately 0.047 square inches (the sum of the cross-sectional area of all five channels). Accordingly, the ratio of the total cross-sectional area provided for polymer flow to the overall cross-sectional area of the breaker plate is 0.107.

Breaker plate 345 may also support a filter which is used to remove contaminants from the polymer melt. Typical filters used in polymer extrusion range from 100 to 400 mesh (100-400 lines per square inch).

The polymer melt, after flowing through the breaker plate and filter exits the adapter and enters a crosshead assembly 350 where it is forced through an extruder die 360. The polymer melt emerging from the extruder die 360 is referred to as an extrudate. The shape of the extrudate immediately leaving the extruder die is not the final shape. For example, in wire coating, a wire 318 travels along a wire path through the crosshead assembly where it comes into contact with the polymer melt which coats the wire. Upon emerging from extruder die 360, the walls of the polymer coating rather than being uniformly concentric and parallel forms a cone around the wire. This phenomena is partially attributed to extrudate swell. As the wire is further drawn away from the extruder die, the coating walls become uniformly parallel.

Currently available extruders are unable to effectively produce ultra-thin wall, less than 50.8 microns (0.002 inch) in wall thickness, pin-hole free, polymer products. This inability is in part due to the presence of polymer melt contaminants, such as gels and thermally degraded polymers, and the rheological properties of the polymer. Ultra-thin coating is necessary in biomedical implants, where wires with diameters as small as 25.4 microns (0.001 inch) are used and must substantially retain their inherent flexibility and small diameters. Complete coverage of the wire with polymer is necessary to prevent unintended contact between the bare conductor and body fluids and tissue. When attempts to place ultra-thin coatings on such wires have been made, the resulting coating is incomplete or covered with pinholes.

In addition, currently available extruders do not provide an effective method for instantaneous visual inspection of the ultra-thin extrudate. Such inspection would be advantageous as it would allow an extruder operator to determine whether the extrudate is being uniformly formed, i.e., that the polymer coating extruded on a wire is uniform in thickness and concentric. Consequently, an extruder may be operated for a long period before any defect is noticed. This results in wasted material and loss of production time.

Non-uniformity of the extrudate walls may be corrected by adjusting the position of the extruder die 360 along different lateral axes. However, such extruder die adjustments are made cumbersome by the current adjustments mechanisms incorporated in currently available extruders (see FIG. 11). Present extruders commonly employ four adjustment screws 370 that act directly on die 360 to adjust the die's position. Consequently, adjusting the die position is time consuming because each screw must be manipulated to adjust the die. On many small extruders, such as a ⅜-inch extruder, at least one of the four adjustment screws 370 is placed in a difficult to accessed location. Unlike thicker walled wire coating, attempts to produce thin walled polymer coatings over wire do not provide the capability to adjust the concentricity of the coating without stopping the coating process. Consequently, the extruder must be stopped to make time consuming die adjustments. This results in numerous trial and error runs to achieve a uniform product.

BRIEF SUMMARY

In a first separate aspect, the present invention may take the form of a method of coating metal wire with extrudate using an extrusion system. The method includes the steps of advancing the metal wire through an extrusion die of the extrusion system and extruding molten extrudate over the metal wire as the metal wire is advanced through the extrusion die. Image data is generated, using one or several electronic cameras, concurrently with the advancing and extruding to provide visual feedback indicative of the concentricity or nonconcentricity of extrudate surrounding the metal wire as the metal wire exits the extrusion die.

In a second separate aspect, the present invention may take the form of a method of coating metal wire with extrudate using an extrusion system. The method includes the steps of advancing the metal wire through an extrusion die of the extrusion system and extruding molten extrudate over the metal wire as the metal wire is advanced through the extrusion die. Image data is generated using one or several electronic cameras, concurrently with the advancing and extruding to provide visual feedback indicative of the concentricity or non-concentricity of extrudate surrounding the metal wire as the metal wire exits the extrusion die. Additionally, the metal wire is adjusted relative to the extrusion die to modify the profile of the extrudate relative to the metal wire as the metal wire exits the extrusion die in response to the generated image data, wherein adjusting the metal wire occurs without stopping the advancing and extruding.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 1 is a partial front view of an extruder incorporating the present invention.

FIG. 2 is a top view of the extruder of FIG. 1.

FIG. 3 is a side view of the extruder of FIG. 1.

FIG. 4 is a sectional view taken along line 4-4 of the extruder of FIG. 1.

FIG. 10 is perspective view of a prior art extruder.

FIG. 11 is a front view of a prior art extruder.

FIG. 12 is a perspective view of the present invention.

DETAILED DESCRIPTION

Figure 5:
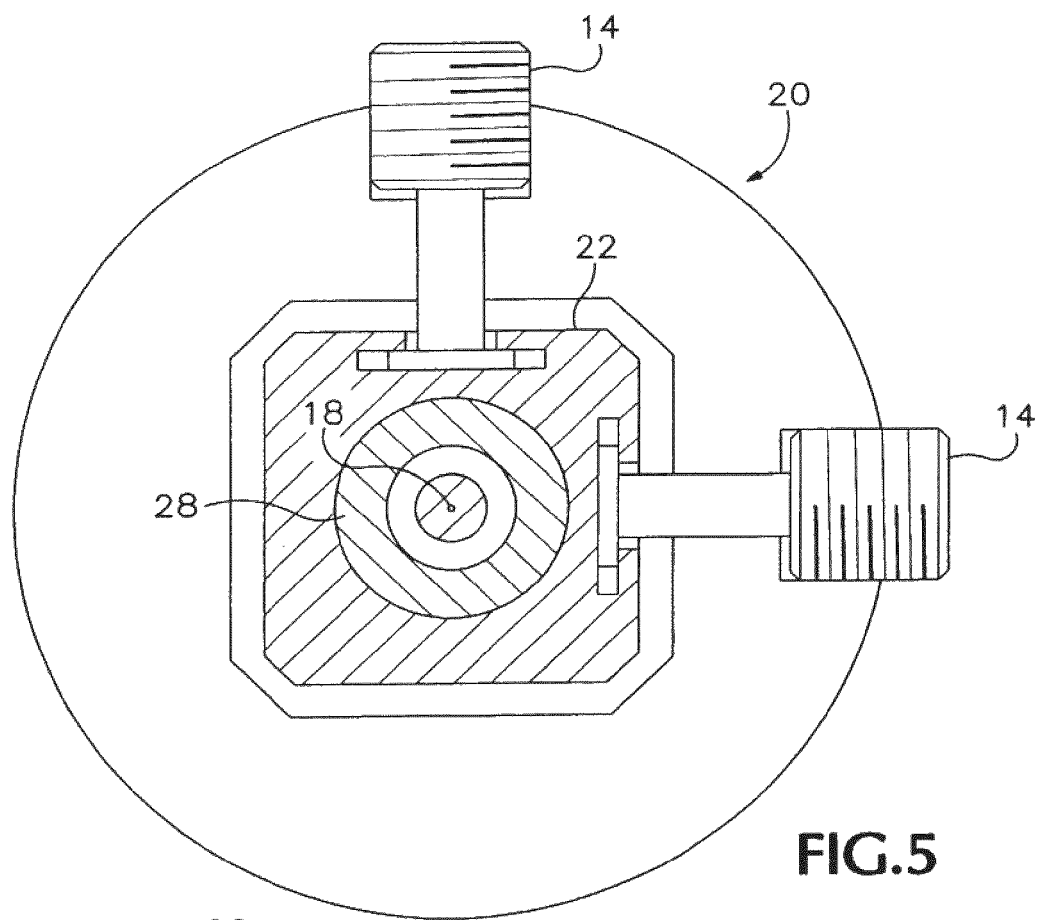
FIG. 5 is a sectional view taken along line 5-5 of the extruder of FIG. 1.
Figure 6:
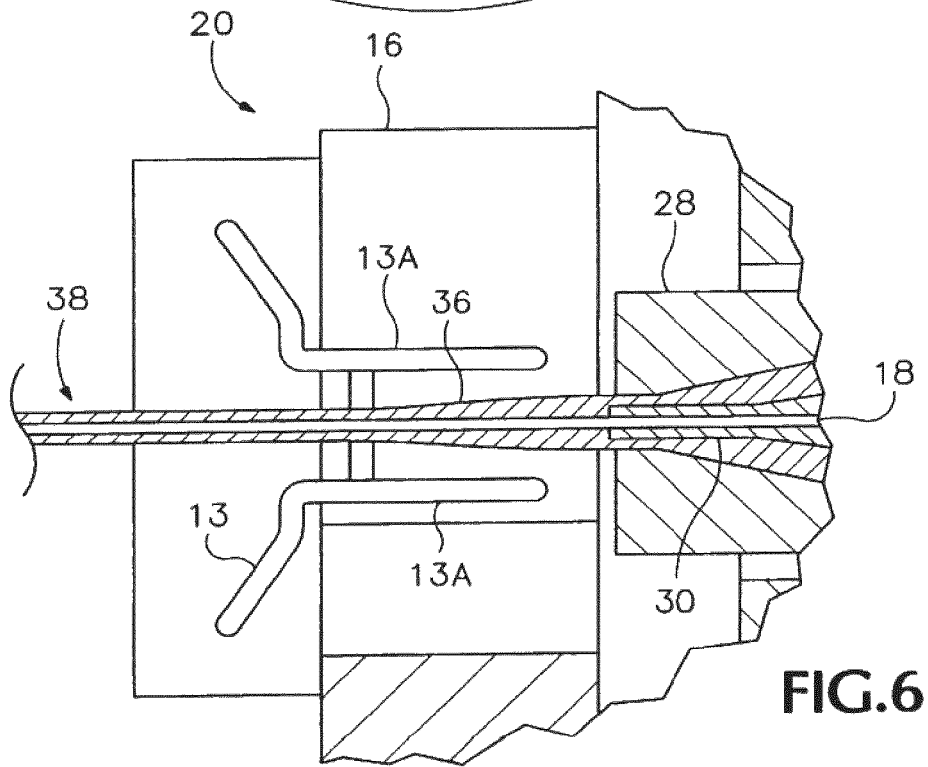
FIG. 6 is a partial sectional view of the extruder of FIG. 1.

An exemplary embodiment of the present invention as applied to a typical extruder for wire coating is generally indicated as 10 in FIGS. 1 through 9 and 12. FIGS. 1, 2, 3, 4, 6 and 12 show an improved cross-head assembly that includes an external extrudate heater 16. Heater 16 may be attached and removed to the exterior of die housing 20 by securing bolt 24 (FIG. 3). It was discovered that heating the extrudate 36 (FIG. 6) exiting the extrusion die enabled the extruder to coat wires as thin as 25.4 microns(0.001 inch) with polymer coats of less than 50.8 microns (0.002 inch) wall thickness. Extrudate heater 16 incorporates a resistance heating element 13 made of a nichrome wire of 16 to 24 gauge (AWG) (35-40 mil) (0.035-0.040 inches). Heating element 13 is bent into a loop 13A to surround the extrudate swell 36 as it exits the die (see FIG. 6). The amount of heat output may be controlled by several methods. In one method, a uniform and steady electric current of approximately 5-20 amps, preferably 10-13 amps, is passed through heating element 13 by an electrical source causing heating element 13 to heat the extrudate 36 emerging from the die. The electric current may be regulated by a feedback controller. Another method of controlling the heating of the extrudate swell is through regulated temperature control. A thermocouple 200 (FIG. 3) is located within the space between the bent heating element 13A and the extrudate swell. The temperature of the extrudate is measured by thermocouple 200 in conjunction with a readily available thermocouple temperature read-out device. The measured temperature may then be controlled with feedback control which manipulates the flow of electric current through heating element 13. The temperature range to be maintained is dependent upon the polymer used. For example, when coating a 25.4 micron diameter conductor with Ethylene Tetrafluoroethylene (ETFE) a temperature range of 730-800.degree. F., preferably 780.degree. F., was found to allow the polymer melt to completely coat the conductor with a polymer coat of less than 50.8 micron wall thickness. A third method of controlling the heat output of heating element 13 is by electrical voltage regulation: the voltage across heating element 13 is set at a specified voltage which controls the flow of electric current.

Figure 7:
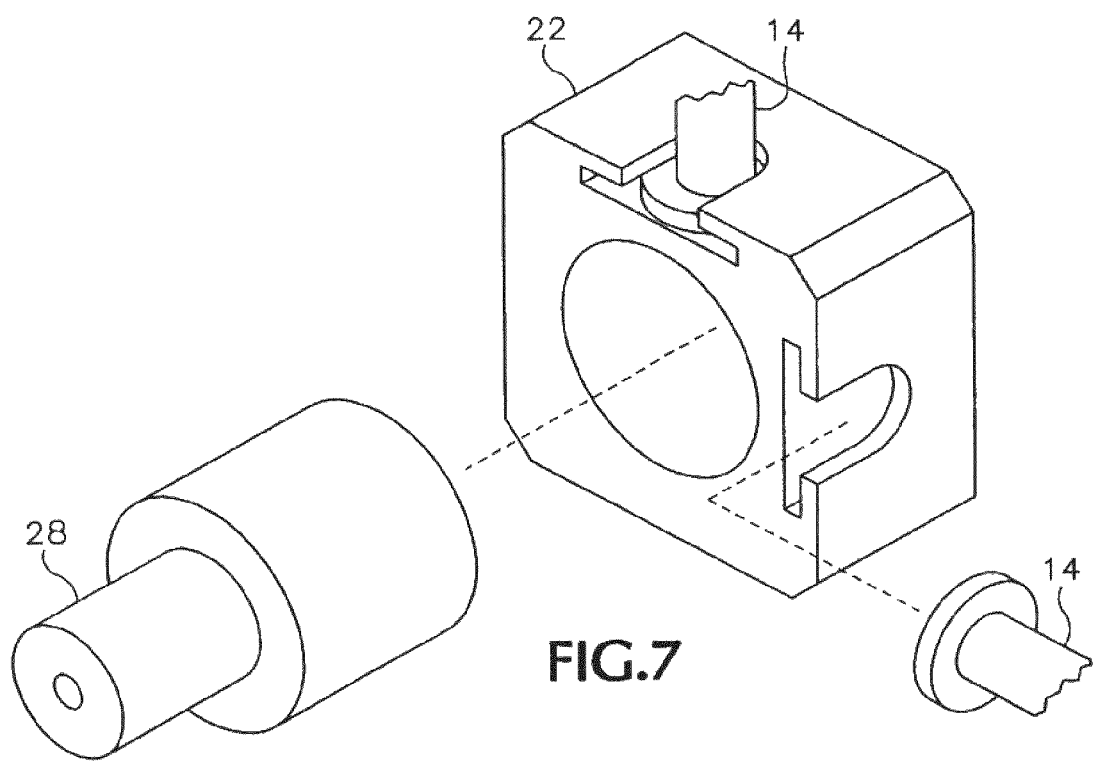
FIG. 7 is a partial exploded view of the extruder of FIG. 1.

Another aspect of the present invention is shown in FIGS. 4, 5, and 7. A die 28 is defined by rounded surfaces along its longitudinal axis, and fits snugly into the annular space provided by a die holder 22, thereby allowing die adjustments with adjusting screws 14. The rounded surfaces of die 28 enables die 28 to be manufactured at a lower costs than current dies which are shaped with flat and rounded surfaces along their longitudinal axes. The position of die 28 may be adjusted by manipulating two die holder adjusting screws 14 which in turn pushes and pulls die holder 22 along two different perpendicular lateral directions. The provision of only two die adjusting screws 14 allow for easier and quicker die adjustments. In addition, instead of using adjusting screws 14, the position of die 28 may be adjusted by the incorporation of electrical driver devices such as piezoelectric actuators.

Figure 8:
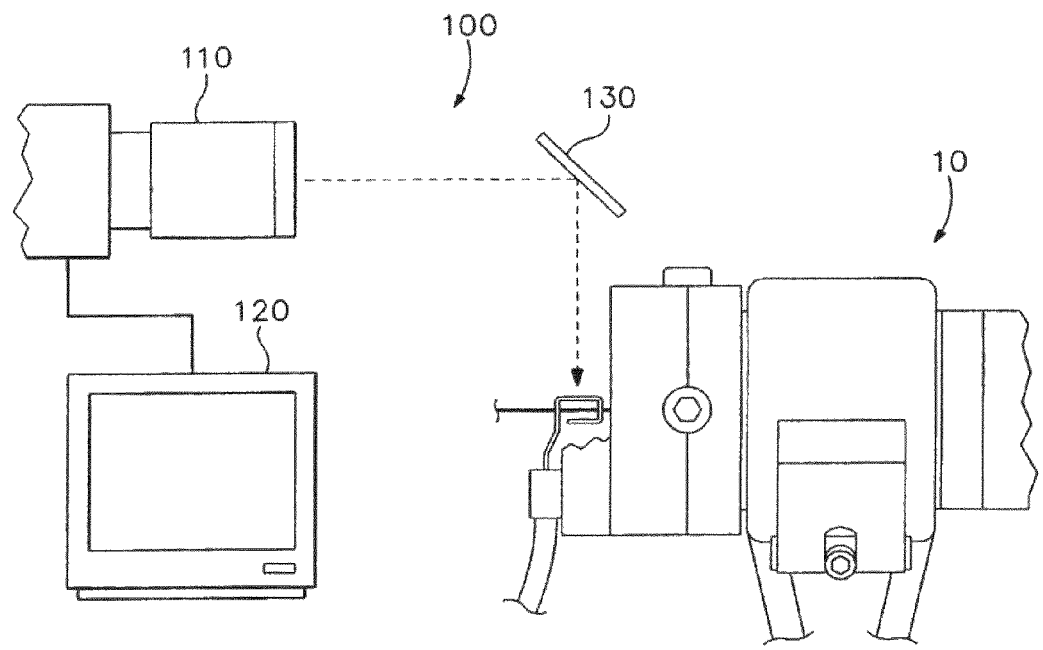
FIG. 8 is a partial front view and partial schematic view of an extruder system incorporating the present invention.
Figure 9:
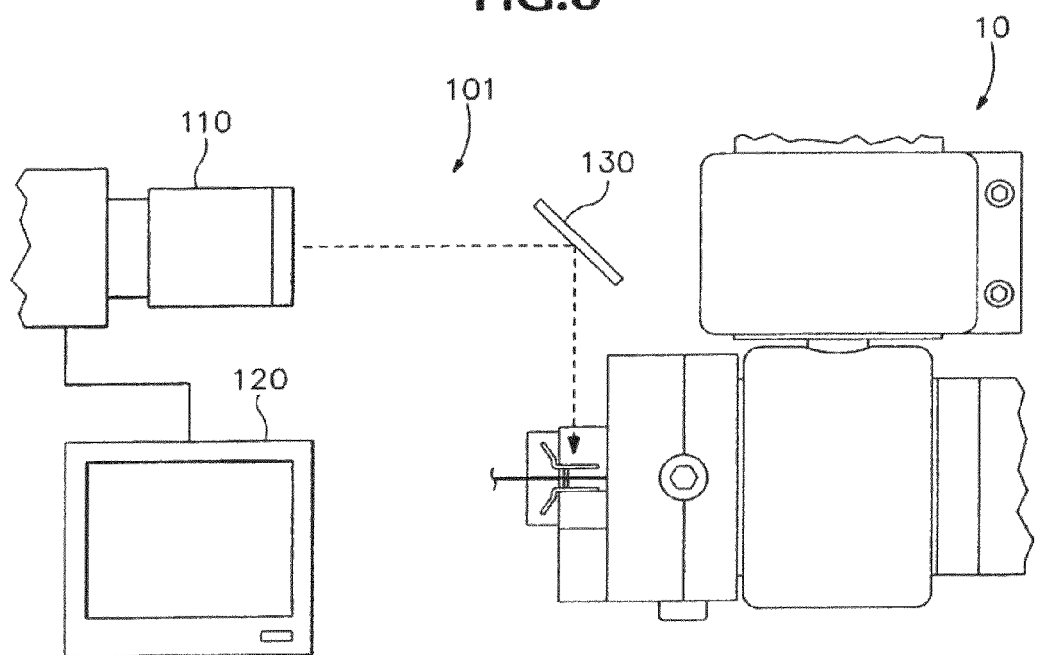
FIG. 9 is a partial front view and partial schematic view of an extruder system incorporating the present invention.

Another aspect of the present invention is shown in FIGS. 8 and 9. Visual monitoring equipment 100 and 101 comprising of video cameras 110, monitors 120, and mirrors 130 are arranged to provide for up-close visual observation of the extrudate in two different lateral perspectives. Up-close and magnified observation of the extrudate in two perspectives will alert the operator to any non-uniformity or non-concentricity in the extrudate emerging from the extruder die, thereby, allowing the operator to make timely adjustments to correct the defect.

Another aspect of the present invention is shown in FIG. 12. A breaker plate 200 defined by a substantially solid cylinder having an outer circumference 205 and an inner circumference 210 which are further defined by a plurality of uniform diameter channels 230. In an exemplary embodiment, a breaker plate for a ⅜-inch extruder was manufactured to provide a cross-sectional area for flow 141% greater than the prior art breaker plate by increasing the number of channels 230 to seven as opposed to five (FIG. 12). In addition, to provide for structural integrity the breaker plate was manufactured to be approximately 150% longer in length than the standard breaker plate. Accordingly, the ratio of cross-sectional area for polymer flow to the overall cross-sectional area of the breaker plate was increased to 0.151, i.e., by 141%.

The increased cross-sectional area for flow minimizes polymer melt flow resistance and corresponding die pressure.

Also, the increased flow area reduces the residence time of the polymer melt in the extruder barrel. This reduction minimizes the thermal degradation of the polymer, thereby minimizing the formation of polymer melt contaminants such as gels and thermal polymer degradation products. In addition, the increased area also allows for use of finer filters for filtering out polymer melt contaminants. These contaminants promote pin-hole formation in ultra-thin extrusions. Filters larger than 3 microns, e.g., 100-400 mesh, have been found to be insufficient for ultra-thin wall extrusion.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed:

1. An extrusion system for coating wire with polymer material, comprising:
    a breaker plate for causing molten polymer material to flow in a linear manner;
    a filter for filtering polymer melt contaminants from the molten polymer material, wherein the filter has a filter size of less than 3 microns;
    a die holder with an annular interior space;
    an extrusion die within the annular interior space of the die holder, wherein the extrusion die is adapted to extrude a coating of approximately 50.8 microns of polymer material on an approximately 25.4 micron diameter wire;
    an extrudate heater attached immediately adjacent to the extrusion die to heat the polymer extrudate swell about the wire as the wire exits from the extrusion die, wherein the extrudate heater comprises a wire loop to heat the wire in an ambient environment after the wire exits the extrusion die and proceeds through the wire loop;
    a thermocouple, disposed in a space between the wire loop of the extrudate heater and the extrudate swell, that generates a signal indicative of a temperature of the extrudate swell; and
    a controller for controlling operation of the extrudate heater based upon a signal received from thermocouple.

2. The extrusion system of claim 1 wherein the extrudate heater heats the extrudate swell to a temperature of approximately 730° F. or greater.

3. The extrusion system of claim 1 wherein the extrudate heater heats the extrudate swell to a temperature of approximately 780° F.

4. The extrusion system of claim 3 wherein the breaker plate has a ratio of cross-sectional area for polymer flow versus total cross-sectional area of approximately 0.151.

5. The extrusion system of claim 3 further comprising:
    visual monitoring equipment to provide image data of the extrudate about the wire in two different lateral perspectives.

6. The extrusion system of claim 5 wherein the visual monitoring equipment comprises a video camera, mirror, and monitor for each of the two different lateral perspectives.

7. The extrusion system of claim 5 wherein the extrusion system permits an operator to view the extrudate about the wire during operation of the extrusion and to adjust adjustment screws of the extrusion system without interrupting operation and the system.

* * * * *